United States Patent [19]

Shibata

[11] 4,024,934
[45] May 24, 1977

[54] BRAKE SHOE

[75] Inventor: Masahiro Shibata, Tsuzuki, Japan

[73] Assignee: Kabushiki Kaisha Daikin Seisakusho, Osaka, Japan

[22] Filed: Jan. 5, 1976

[21] Appl. No.: 646,499

[30] Foreign Application Priority Data

Jan. 8, 1975  Japan .......................... 50-5711[U]

[52] U.S. Cl. ............................. 188/250 G; 188/329
[51] Int. Cl.² ......................................... F16D 65/08
[58] Field of Search ....... 188/250 B, 250 F, 250 G, 188/251 M, 255, 217, 329, 332

[56] References Cited

UNITED STATES PATENTS

| | | |
|---|---|---|
| 1,486,854 | 3/1924 | Bartholomew ................ 188/250 G |
| 1,620,030 | 3/1927 | Krieg ................ 188/250 G |
| 1,806,297 | 5/1931 | Kohr .................... 188/332 |
| 1,943,836 | 1/1934 | Norton ............... 188/329 |
| 2,064,103 | 12/1936 | Burdick .............. 188/329 |
| 2,089,080 | 8/1937 | Valentine ................ 188/251 M X |

Primary Examiner—Duane A. Reger
Attorney, Agent, or Firm—Pierce, Scheffler & Parker

[57] ABSTRACT

The brake shoe of the present invention comprises a wear brake shoe body against which there has been cast a layer of metal consisting of hardenable material. By making the casting sufficiently thick the wear layer is prevented from losing its surface hardness.

1 Claim, 3 Drawing Figures

BRAKE SHOE

This invention relates to a brake shoe in which a wear layer of hardenable sleeper metal is cast in at a contacting part with a cam, and its object is to prevent dents, widening, loosening, and wear while servicing.

Figure 1:
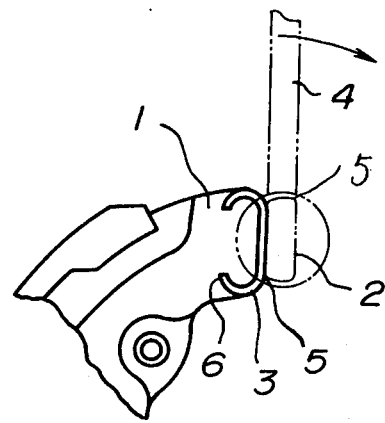
FIG. 1 is a partial front view of a conventional brake shoe.

A wear layer 3 made of hardened SK material or the like has hitherto been cast in at a contacting part of an aluminum alloy brake shoe body 1 (FIG. 1), and a cam 2 having a rectangular section in order to avoid wear thereat. A lever 4 was operated and moved in the arrowed direction when braking; thus, a corner 5 of the cam 2 pressed a surface of the hardened metal layer 3 toward the left in FIG. 1. Although not illustrated in the figures, a brake shoe at the right side was also equipped with a similar wear layer, and an upper part corner 5 presses it toward the right when braking. A conventional wear layer 3, however, is made of hardened material and further has a thin body thickness, so that its hardness decreases when casting due to exposure to a high temperature. This circumstance has many troubles such as dents, widening (separation of a curved part 6), loosening, and wear. Even if a chiller is applied on a surface (right side surface of FIG. 1) of the wear layer 3 when casting, it can hardly be expected to prevent the decrease in its hardness due to the thin body thickness. Moreover, the thin body of the wear layer 3 is subject to deformation, so that peeling-off between the brake shoe body 1 and its lining material, e.g. aluminum, is apt to be produced to further aggravate the above mentioned troubles.

An object of this invention is to avoid the above-mentioned troubles which have occurred frequently. This can be effected, according to the invention, by sufficiently thickening the wear layer to an extent that its surface hardness does not lower when being cast; that is, to an extent that the chiller functions effectively.

Figure 2:
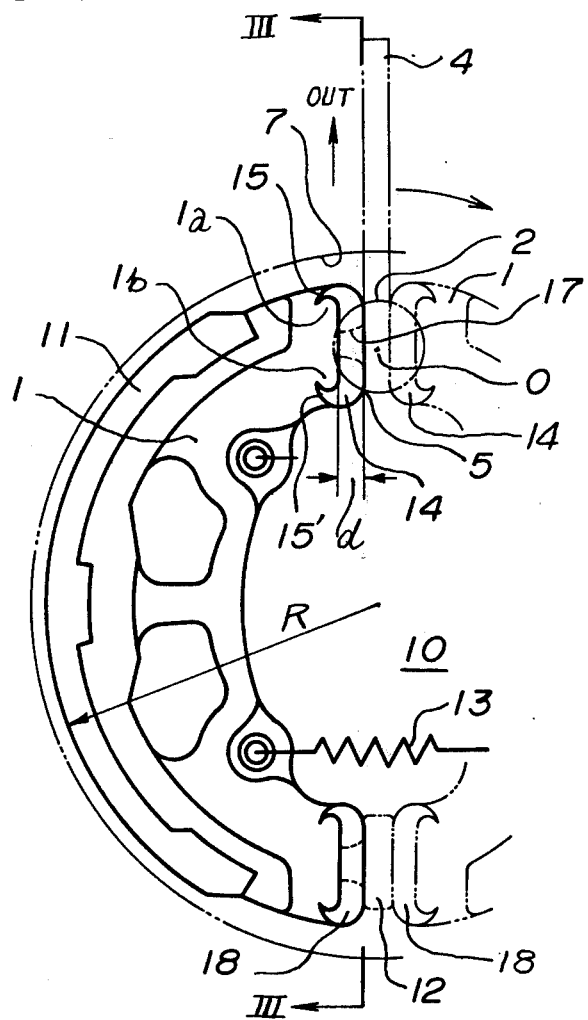
FIG. 2 is a partial front view of a tractor brake equipped with a brake shoe in accordance with this invention.
Figure 3:
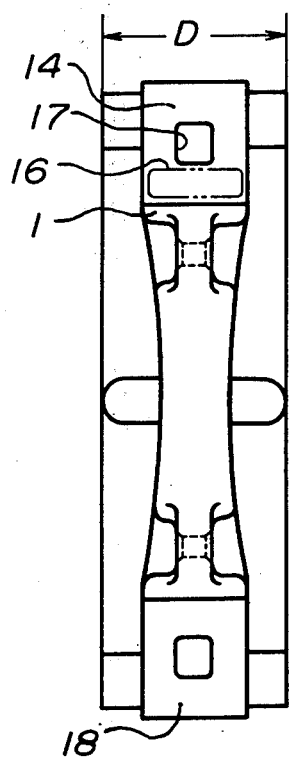
FIG. 3 is a vertical sectional view taken substantially on the line III—III of FIG. 2.

In FIGS. 2 and 3 showing embodiments of this invention, symbols same with those in FIG. 1 indicate corresponding parts therewith.

Cam 2 is pivotally freely supported on a fixed backing plate 10. The lever 4 is fixed to a projecting portion on the back of the plate 10, and is connected to a brake pedal through a link, cable etc. (they are not illustrated in the figures), being operated by turning clockwise with its center at the central point 0 of cam 2 when braking. 11 is a lining bonded to the brake shoe body 1 made of aluminum alloy, 12 is an anchor pin fixed to the backing plate 10, and 13 is a return spring.

The thickness d of wear layer 14 can be taken as for ex. $d = 4.5$ mm in case of a tractor brake shoe in which a radius of curvature of the lining 11 is 47.5 mm and a width D is 26 mm. Hardenable material such as SC and SK steels are suitable for the material, and it is effectively hardened. The wear layer 14 includes, at both inner and outer ends viewed in the axial direction, hook-shaped curved portions 15 and 15' the thickness of which decreases smoothly toward the top ends thereof. The outer curved portion 15 is bent inwardly to securely hold an aluminum lining at a part 1a, the top end of the inner curved portion 15' being bent outwardly to similarly securely hold the lining at a part 1b, thus mechanically preventing the wear layer 14 from separating from the shoe body 1 to the cam 2 side. The layer of wear layer 14 shown in the figure includes a hole 17 at a position deviated from a part 16 (FIG. 3), against which the corner 5 of the cam 2 presses. The hole 17 is a bore through part 14 with its inner diameter enlarged toward the side of cam 2. The lining of the shoe body 1 is filled in the hole 17, thus the lining therein preventing the wear layer 14 from getting away toward the cam 2 side and from slipping off in lateral direction (left and right direction of FIG. 3). A layer of wear layer 18 is also cast in at a part where the shoe body contacts with an anchor pin.

When a brake pedal is stepped on, a brake lever is pulled up, to turn the lever 4 shown in FIG. 2 in the arrowed direction, the wear layers 14 and 14 at both sides are pushed forth in either direction by means of the cam 2, the shoe bodies 1 and 1 are widened to both right and left sides with contacting points of the anchor pin 12 and the wear layers 18 and 18 at their centers, and the lining 11 is pressed against an inner surface of the rotating brake drum 7 to apply the braking force thereon. In this braking moment the corner 5 of the cam 2 contacts against and slides on the surface of the left side wear layer 14. However, there is not the possibility of the metal being deformed by the force applied from the corner 5 because the thickness d of the wear layer 14 is made great enough. Moreover, when casting the wear layer 14 in the shoe body 1 through the use of a die casting machine, etc., the thick metal thickness d makes it possible to keep temperature rise at the contacting part of the wear layer 14 and the cam 2 as low as possible by using a general conventional chiller, thus surely preventing a decrease in hardness through tempering of the surface of the wear layer 14. The employment of the above-mentioned thicker metal thickness of the wear layer 14 and the prevention of the decrease in the surface hardness make it possible to avoid troubles such as dents, widening, loosening, and wear at the contacting part with the cam in comparison with the conventional thin wear layer 3 (FIG. 1) heretofore customarily used. In order to prevent loosening and slipping off of the wear layer 14, it is effective that a hole 17 be provided which is tapered and enlarged toward the cam 2 as shown in FIG. 2, and that the lining material of the shoe body 1 be filled inside the hole 17. The wear layer 18, fitted to the contacting part with the anchor 12, also offers the advantage of improvement of durability of the whole shoe.

By the expression wear layer as used herein applicant means a surface reinforcement cast-in-place of at least partially buried hard metal particles for providing a hard, anti-friction surface. In further explanation, this anti-friction material functions similarly to that of cross-ties or sleepers in a railroad track.

I claim:

1. In a brake shoe of a brake having an anchor pin (12) and a cam (2) on a backing plate (10), a pair of segmental brake shoe bodies (1) both ends of which seat on said anchor pin (12) and cam (2) through the function of an elastic force of a pair of return springs (13), a drum surrounding an outside of said shoe, and a lever (4) turning said cam when braking; the improvement according to which the said brake shoe comprises an upper cast wear layer (14) containing hard metal particles which is provided by casting in at a contacting part with the cam (2), said cast wear layer (14) having a hole (17) provided at a position deviated from a part (16) against which a corner (5) of the cam (2) presses, said hole (17) having a tapered shape with its inner diameter enlarged toward the cam (2) side, and a lining filled in the hole (17) of the shoe body that prevents the wear layer (14) from loosening toward the cam (2) side and from slipping off in lateral direction, curved portions (15) and (15') of said wear layer intruding into the brake shoe body (1) at least at radially inner and outer ends, the thickness ($d$) of said wear layer (14) being made sufficiently great that its surface hardness does not lower when being cast, said brake shoe being further characterized in that a lower wear layer (18) substantially the same as that at a contacting part with the cam (2) is also cast in at a contacting part with the anchor pin (12).

* * * * *